(12) United States Patent
Burns et al.

(10) Patent No.: US 10,495,364 B2
(45) Date of Patent: *Dec. 3, 2019

(54) SYSTEM AND METHOD FOR CONTROLLING VAPOR COMPRESSION SYSTEMS

(71) Applicant: Mitsubishi Electric Research Laboratories, Inc., Cambridge, MA (US)

(72) Inventors: Daniel J Burns, Wakefield, MA (US); Christopher R. Laughman, Waltham, MA (US); Scott Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/281,160

(22) Filed: Sep. 30, 2016

(65) Prior Publication Data

US 2017/0016661 A1    Jan. 19, 2017

Related U.S. Application Data

(63) Continuation of application No. 13/851,722, filed on Mar. 27, 2013, now Pat. No. 9,534,820.

(51) Int. Cl.
 *F25B 49/02* (2006.01)

(52) U.S. Cl.
 CPC ............ *F25B 49/02* (2013.01); *F25B 49/022* (2013.01); *F25B 2500/19* (2013.01); *F25B 2600/021* (2013.01); *F25B 2600/0253* (2013.01); *F25B 2600/2513* (2013.01); *F25B 2700/2106* (2013.01); *F25B 2700/21152* (2013.01); *Y02B 30/741* (2013.01)

(58) Field of Classification Search
 CPC ............ F25B 49/02; F25B 2700/21152; F25B 2500/19
 See application file for complete search history.

(56) References Cited

U.S. PATENT DOCUMENTS 5,042,264 A    8/1991    Dudley
5,052,186 A    10/1991    Dudley et al.
(Continued)

FOREIGN PATENT DOCUMENTS

EP    2551614 A2    1/2013

*Primary Examiner* — Ljiljana V. Ciric
*Assistant Examiner* — Alexis K Cox
(74) *Attorney, Agent, or Firm* — Gennadiy Vinokur; James McAleenan; Hironori Tsukamoto

(57) ABSTRACT

A method controls a vapor compression system including a variable speed compressor. A desired discharge temperature of the compressor is determined using a mapping between values of the discharge temperature of the compressor and values of speed of the compressor and outdoor air temperature. A transition function for transitioning a current discharge temperature to the desired discharge temperature is determined, such that the transition function is continuous and a rate of change of the transition function is limited. Next, a valve of the vapor compression system is controlled such that the discharge temperature is transitioned to the desired discharge temperature based on the transition function.

7 Claims, 8 Drawing Sheets

(56) References Cited

U.S. PATENT DOCUMENTS

| | | | |
|---|---|---|---|
| 5,062,276 A | | 11/1991 | Dudley |
| 5,257,508 A | | 11/1993 | Powell et al. |
| 5,311,748 A | | 5/1994 | Bahel |
| 5,454,511 A | * | 10/1995 | Van Ostrand ............ F24F 11/00 236/46 R |
| 5,628,201 A | * | 5/1997 | Bahel ....................... F24F 11/70 62/211 |
| 2012/0253592 A1 | | 10/2012 | Senthil et al. |

* cited by examiner

100

200

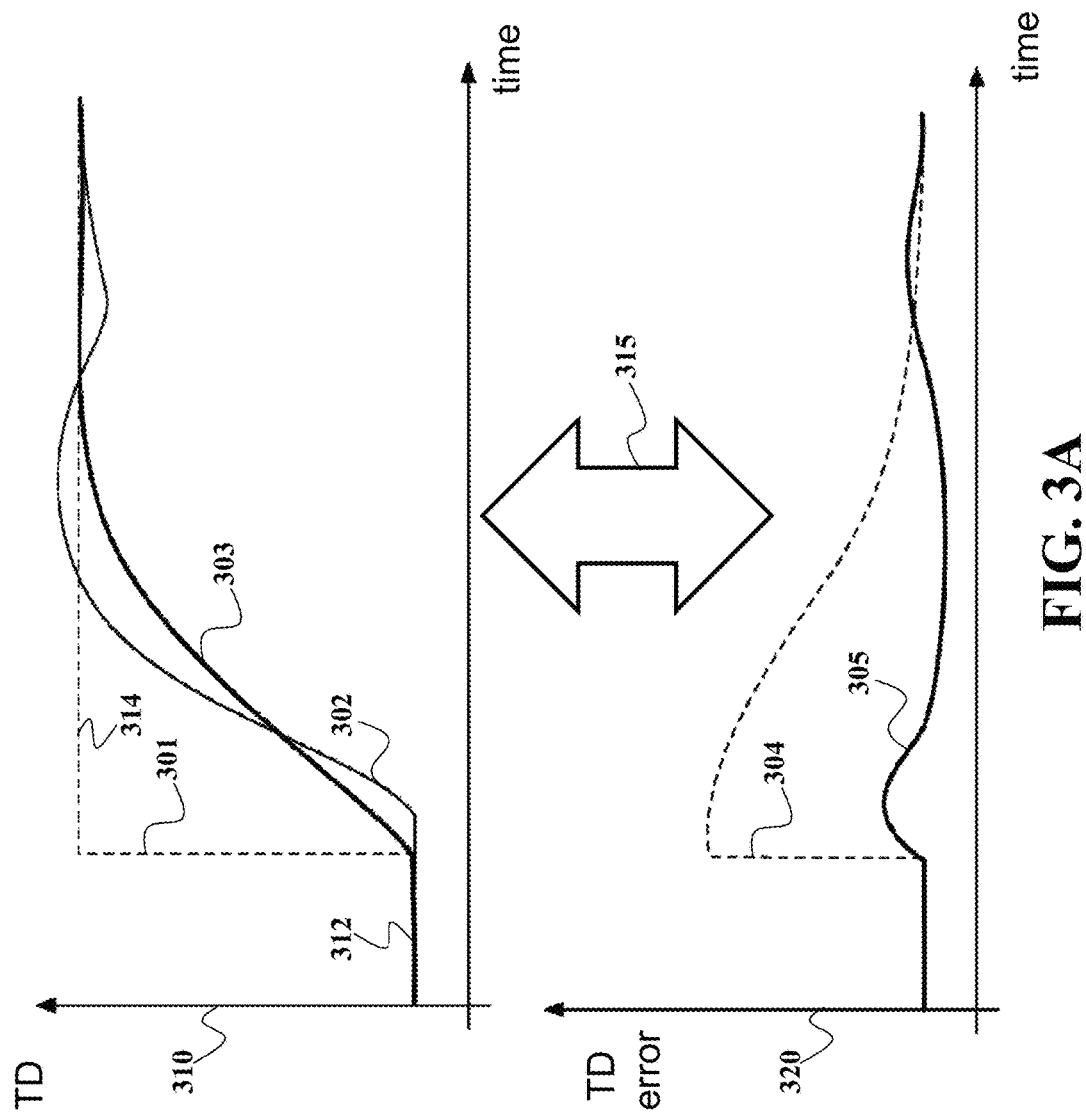

399

SYSTEM AND METHOD FOR CONTROLLING VAPOR COMPRESSION SYSTEMS

FIELD OF THE INVENTION

This invention relates generally to vapor compression systems, and more particularly to controlling operations of the vapor compression system.

BACKGROUND OF THE INVENTION

Vapor compression systems, such as heat pumps, refrigeration and air-conditioning systems, are widely used in industrial and residential applications. The vapor compression systems are large consumers of electrical energy and require efficient means cooling and heating. It is desirable to improve the operating efficiency of the vapor compression cycle without increasing costs of the components of the vapor compression systems.

The introduction of variable speed compressors, variable position valves, and variable speed fans to the vapor compression cycle has greatly improved the flexibility of the operation. However, the increased flexibility of these variable-actuators requires careful control of the flow rate of the refrigerant mass. Cooling an environment (for example, a room in a house or a display case for food in a grocery store) is achieved by the evaporation of a refrigerant. The cooling includes evaporation process whereby a substance is converted from a liquid to a vapor. This process occurs as heat is absorbed by the refrigerant, thereby removing the heat from the space to be cooled. During the process when some refrigerant is in the liquid phase and some is in the vapor phase, the refrigerant is said to be a two-phase mixture.

This evaporation process occurs in a heat exchanger, commonly called an evaporator. For the most energy efficient operation, the amount of refrigerant that enters the evaporator should be carefully controlled. Ideally, the refrigerant, having a two-phase mixture of part liquid and part vapor, enters the evaporator, and through the process of evaporation, is entirely converted to vapor as the refrigerant exits the evaporator. If too little refrigerant enters the evaporator, then all of the refrigerant is prematurely converted to the vapor phase before the refrigerant exits the evaporator, which implies that a substantial fraction of an evaporator surface area was not used to perform the cooling, thereby reducing the efficiency of the system. Conversely, if too much refrigerant is allowed to enter the evaporator, the refrigerant exits the evaporator while still in the partly liquid phase state, which implies that the full potential to perform useful cooling is not performed in the evaporator, to also reduce the efficiency. In addition, the liquid components of refrigerant exiting the evaporator can be ingested into the compressor, which could potentially cause damage.

The evaporation process is generally a constant-temperature process (with the evaporating temperature depending on the material properties and pressure of the refrigerant during evaporation). After full evaporation, additional heat transferred to the vapor-phase refrigerant causes an increase in the temperature of the refrigerant temperature. The difference in temperature between the elevated vapor phase temperature and the evaporating temperature is called a superheat temperature. Refrigerant exiting an evaporator that has been completely evaporated into the vapor phase exhibits a temperature greater than the evaporating temperature, in other words, have a positive superheat temperature. Properly controlling the refrigerant superheat temperature at the evaporator exit optimizes efficiency, and protects the vapor compression equipment.

To directly measure refrigerant superheat, various methods determine the evaporating temperature at the inlet to the evaporator, which requires measuring the evaporating pressure. After the evaporating pressure is measured, the evaporating temperature can be calculated using refrigerant properties. The vapor temperature at the evaporator exit is also measured, and the superheat is computed as a difference in the measured outlet vapor temperature and the evaporating temperature. This direct measurement methods require at least one pressure sensor and one (more commonly two) temperature measurements. Sensors for measuring refrigerant pressure are costly and often unreliable, and therefore the direct measurement of superheat is usually limited to very expensive systems that can tolerate high component costs and provide redundant means of sensing.

Rather than directly measure superheat, it is possible to estimate the superheat using less expensive temperature sensors. For example U.S. Pat. No. 6,769,264 describes a method for estimating superheat with two dedicated temperature sensors arranged near the inlet and outlet of the evaporator heat exchanger. While this method may estimate the superheat temperature with reasonable accuracy, the method still requires additional dedicated temperature sensors located in particular positions on the heat exchanger. The additional sensors increase the cost of the machine.

U.S. Pat. No. 5,311,748 teaches that refrigerant may be controlled in such a way as to control superheat by using a combination of the compressor discharge temperature (temperature of the refrigerant exiting the compressor) and the outdoor air temperature. The valve position that controls the correct amount of refrigerant is computed using these sensors. While that method avoids unnecessary heat exchanger temperature or pressure sensors, the method is not suitable for vapor compression systems with variable speed compressors.

In consideration of the above, there is a need in the art for a method of measuring the amount of refrigerant entering the evaporator to optimize the efficiency and the cost of the vapor compression systems with variable speed compressors.

SUMMARY OF THE INVENTION

Some embodiments of the invention determine the correct amount of refrigerant for an evaporator without using a pressure sensor or without relying on dedicated heat exchanger temperature sensors. For example, one embodiment of the invention uses only sensors of the vapor compression system installed for alternate reasons, such as equipment protection and monitoring. In this manner, efficient operation can be maintained while keeping components costs to a minimum.

Furthermore, various embodiments of the invention explicitly apply to variable speed compressors, which influence the discharge temperature and position of the valve without destabilizing the operation of the vapor compression systems. In effect, some embodiments regulate superheat in the vapor compression system with variable speed compressors, and in manner that does not require additional sensors.

Some embodiments of the invention are based on the realization that the discharge temperature, which is related to a small positive superheat temperature varies with the outdoor air temperature and the compressor speed. It is further realized that these two factors can be accounted for in computing the correct discharge temperature that achieves the desired superheat temperature.

Some embodiments of the invention are based on another realization that in variable speed vapor compression systems, the compressor speed may change abruptly in reaction to a user-initiated change in room setpoint temperature, causing an abrupt change in the discharge temperature. However, due to variable nature and independent control of the speed of the compressor, that abrupt change in the discharge temperature can destabilize the operation of the entire vapor compression system.

Hence, it is an object of some embodiments of the invention to provide a system and a method for stable operation of the control of various components of the vapor compression system operated with a reduced number of sensors and variable speed compressors.

Accordingly, one embodiment discloses a method for controlling a vapor compression system including a variable speed compressor. The method includes determining a desired discharge temperature of the compressor using a mapping between values of the discharge temperature of the compressor and values of speed of the compressor and outdoor air temperature; determining a transition function for transitioning a current discharge temperature to the desired discharge temperature, such that the transition function is continuous and a rate of change of the transition function is limited; and controlling a valve of the vapor compression system such that the discharge temperature is transitioned to the desired discharge temperature based on the transition function. Steps of the method can be performed by a processor.

Another embodiment discloses a method for controlling a vapor compression system, including determining a desired discharge temperature; filtering the desired discharge temperature using a transition function to produce a rate-limited discharge temperature; and controlling a valve of the vapor compression system such that an error between the actual discharge temperature and rate-limited discharge temperature is minimized. Steps of the method can be performed by a processor.

Yet another embodiment discloses a vapor compression system, including a compressor having a speed for compressing and pumping refrigerant through the system, wherein the speed of the compressor is variable and controlled by a compressor control device configured to determine and adjust the speed of the compressor in response to a change of one or more environmental parameters, and a valve for providing an adjustable pressure between a high-pressure portion and a low-pressure portion of the vapor compression system, wherein the expansion valve is controlled by a valve control device. The system also includes a first temperature sensor for measuring an actual discharge temperature of the compressor; a second temperature sensor for measuring an outdoor air temperature; a memory for storing a mapping between values of the discharge temperature of the compressor and values of the speed of the compressor and the outdoor air temperature; a processor operatively connected to the memory, the compressor control device and the second sensor for determining a desired discharge temperature using the outdoor air temperature, the speed of the compressor and the mapping; and a feedback controller for generating a command to the valve control device to reduce an error between the actual discharge temperature measured by the first temperature sensor and a rate-limited desired discharge temperature determined according to a transition function.

BRIEF DESCRIPTION OF THE DRAWINGS

FIG. 3A is a time-dependent relationship between a change in the values of discharge temperature and errors between values of the actual and desired discharge temperatures;

DETAILED DESCRIPTION OF EMBODIMENTS OF INVENTION

Various embodiments of the present invention provides a system and a method for controlling an amount of refrigerant in a vapor compression system using a limited number of sensors and processing signals such that stability of the system is maintained and efficiency is optimized. To describe the principles of some embodiments, an exemplar vapor compression system is an air conditioner operating in cooling mode (i.e., removing heat from an indoor environment). However, this example is not meant to limit the scope of the invention, and the various embodiments are intended to cover all operational modes of a vapor compression system (air conditioners operating in cooling and heating modes, chillers, freezers, etc.).

Figure 1:
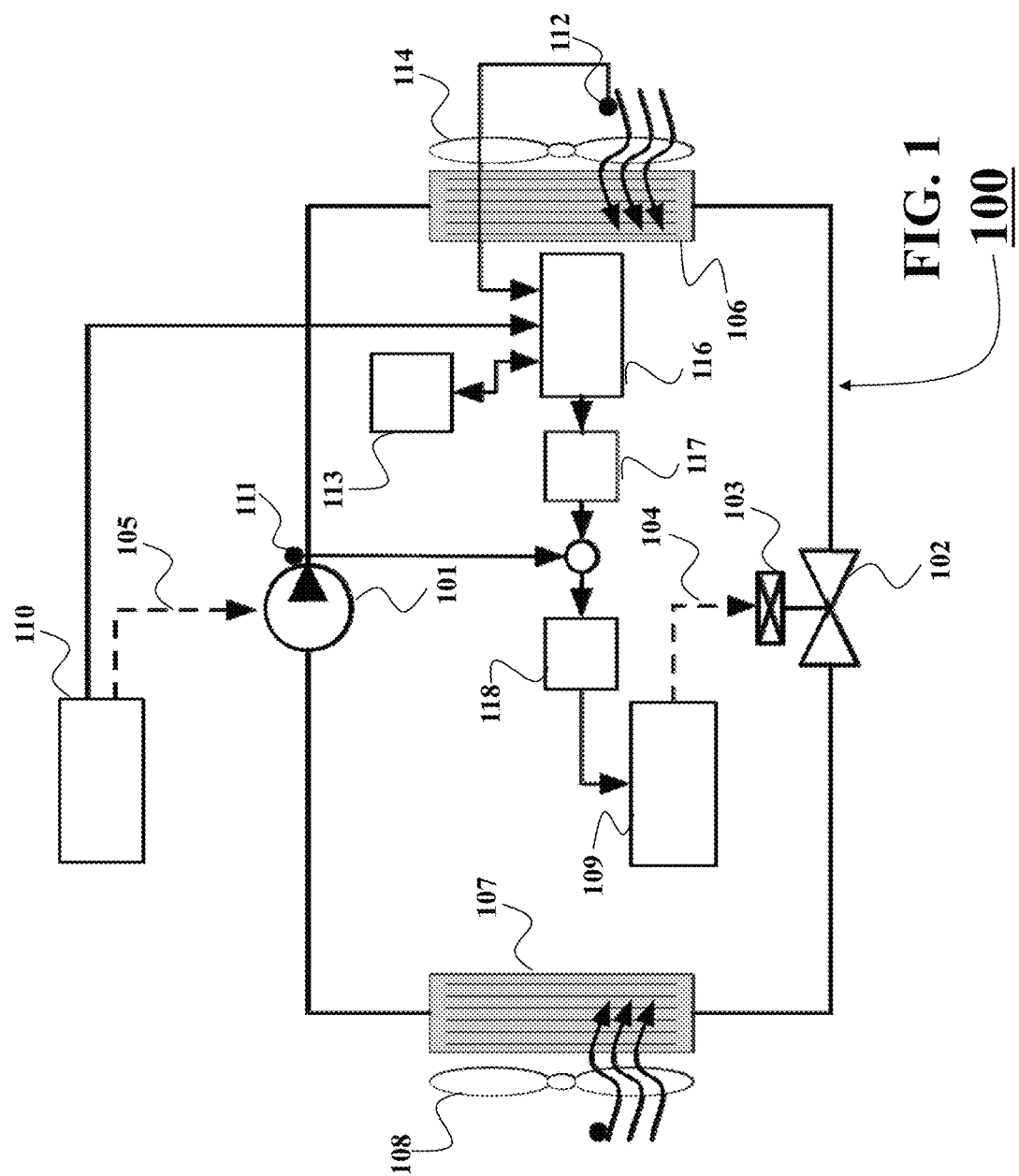
FIG. 1 is a block diagram of a vapor compression system according to one embodiment of the invention.

FIG. 1 shows a block diagram of a vapor compression system 100 according to some embodiments of the invention. An example of the system 100 is any heating, ventilating, and air-conditioning (HVAC) system implementing the vapor compression cycle. Typically, the vapor compression cycle is implemented using actuators of the vapor compression system having an operation controllable by the control systems.

Liquid refrigerant at high pressure is released into a low pressure vessel, e.g., an evaporator 107. As a result of the large decrease in pressure, the refrigerant begins to evaporate, which removes heat from the air surrounding the evaporator, thereby lowering the air temperature. The amount of heat removed from the evaporator is generally considered as the heat load for systems operating in cooling mode. To increase the heat exchange between the refrigerant and the air, a fan 108 can be used to force air movement across the evaporator.

Refrigerant entering the evaporator can be controlled by a flow restricting device. The flow restricting device blocks a sufficient fraction of the refrigerant tubing as to limit the refrigerant mass flow rate and establish two pressure zones:

a high pressure zone upstream of the flow restrictor, and a low pressure zone downstream. In this example, the flow restricting device is an expansion valve for providing an adjustable pressure drop between a high-pressure portion and a low-pressure portion of the vapor compression system. The expansion valve can include a variable position valve 102 actuated by an electronic stepper motor 103 receiving commands 104 from a valve control device 109. Other implementations of the valve are possible.

Additional components of the vapor compression system serve to recover the low pressure vapor refrigerant exiting the evaporator and return the refrigerant to high pressure liquid state. The system can include a compressor 101 having a speed for compressing and pumping refrigerant through the system, wherein the speed of the compressor is variable and controlled by a compressor control device 110. The compressor control device is configured to determine and adjust the speed of the compressor in response to a change of one or more environmental parameters.

Examples of the environmental parameters include, but are not limited to, desired temperature provided by a user, a thermal load on the system as well as air temperatures at an evaporator and a condenser. Some of these environmental parameters, such as the indoor temperature, have a desired value, i.e., a setpoint, for users of the vapor compression system. For example, the setpoint can be one variable, e.g., the indoor temperature. Also, the setpoint can be a set of multiple variables, such as the temperature and relative humidity of the indoor air.

The compressor 101 ingests a low pressure refrigerant from the evaporator and compresses the refrigerant to high pressure vapor. In a variable speed vapor compression systems, the compressor receives a command 105 from a compressor control device 110 that specifies the speed of the compressor. By varying the compressor speed, the mass flow rate and pressure ratio can be adjusted based on the heat load and temperature setpoint.

The high pressure vapor exiting the compressor is routed to another heat exchanger, i.e., a condenser 106, which serves to remove the heat contained in the high temperature, high pressure refrigerant to the ambient environment. As heat is removed from the refrigerant, the refrigerant condenses to the liquid state. Similarly to the evaporator, a fan 114 can be used to move air across the condenser to increase the rate of heat exchange. The resulting refrigerant exiting the condenser has a high pressure and is in the liquid state, and passes through the flow restricting device to complete the cycle.

Some embodiments of the invention are based on a realization that there is a mapping relationship among speeds of the compressor, the outdoor air temperature, and the discharge temperature of the compressor, and that mapping can be used to control the superheat of the vapor compression system, as described in more details below.

Accordingly, in some embodiments, the system 100 also includes a first temperature sensor 111 for measuring a discharge temperature of the compressor 101, a second temperature sensor 112 for measuring an outdoor air temperature, a memory 113 for storing a mapping between values of the speed of the compressor, values of the outdoor air temperature and values of the discharge temperature of the compressor. The system can also include a processor 116 operatively connected to the memory 113, the compressor control device 110 and the second temperature sensor 112. The processor 116 is configured for determining a desired discharge temperature using the mapping and the values of the outdoor air temperature and the speed of the compressor. In turn, the desired discharge temperature can be used to control the superheat.

The system 100 can also include a feedback controller 118 for generating a command to the valve control device 109 to reduce an error between a current discharge temperature measured by the first temperature sensor 111 and a desired discharge temperature. In various embodiments the desired discharge temperature is smoothened using a transition function to produce a rate-limited discharge temperature. As described below, the transition function is determined for transitioning a current discharge temperature to the desired discharge temperature continuously, as contrasted with an abrupt transition. In such manner, the operation of the system 100 is stabilized.

In some embodiments, transition function is generated by a transition module 117, such that the transition function is continuous and a rate of change of the transition function is limited. In alternative embodiments, the transition function is generated by the processor 116. However, other implementations are possible. For example, in some embodiments, the processor 116 is used to implement one or more of the controllers 109, 110, and 118. In alternative embodiments, the controllers are implemented using additional processors.

Through numerous experiments, it is realized that superheat can be uniquely determined from values of: (i) the compressor speed (ii) the outdoor air temperature, and (iii) the compressor discharge temperature. Therefore, by controlling the speed and temperatures, the superheat temperature can be controlled.

Figure 2A:
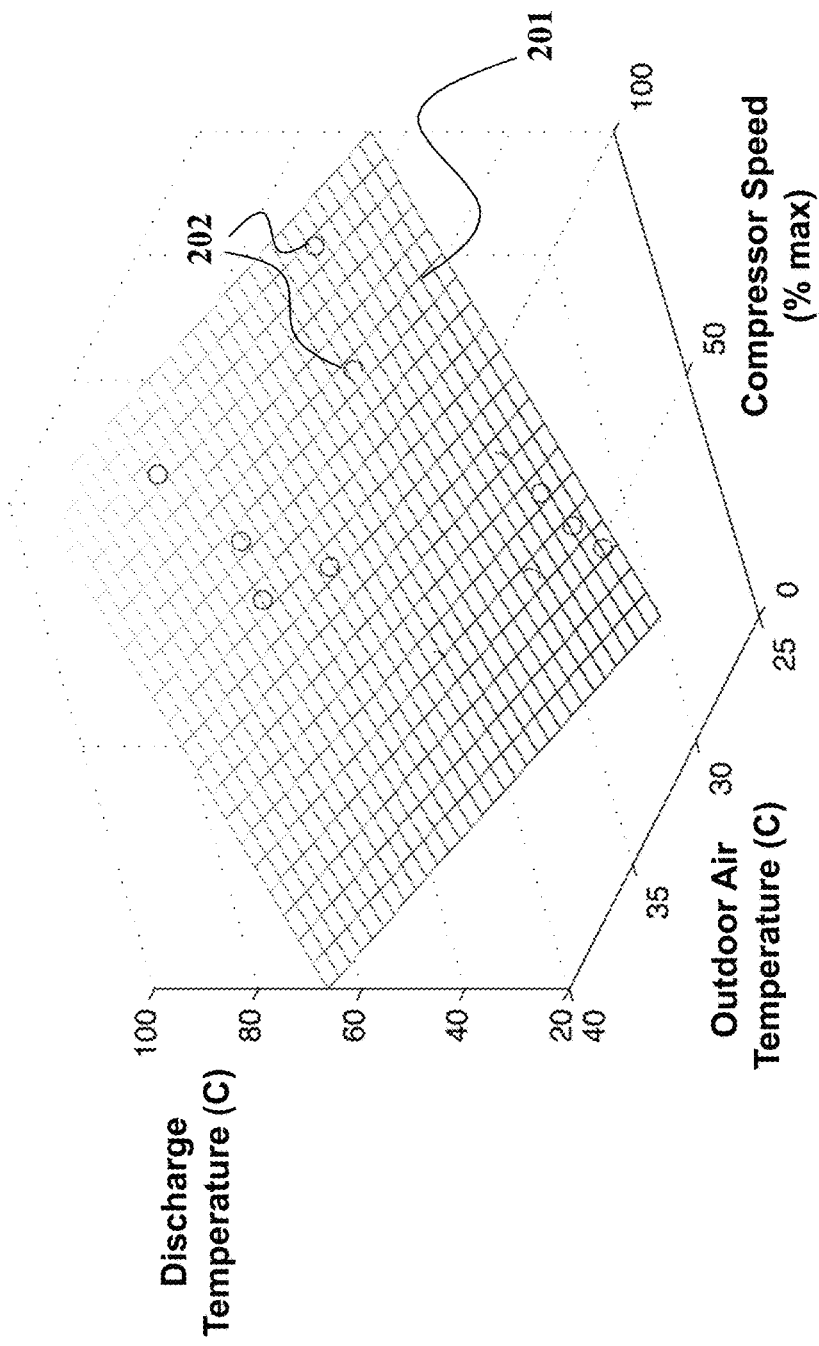
FIG. 2A is an illustration of a mapping between discharge temperature of a compressor of the vapor compression system, speed of the compressor, and the outdoor air temperature according to one embodiment of the invention.

FIG. 2A shows a manifold 201 or topological space describing an example of a mapping 200 between the discharge temperature of the compressor, the speed of the compressor, and the outdoor air temperature. However, in the vapor compression systems having variable speed compressors, the compressor speed is usually determined independently by the compressor control module 110, e.g., in response to a change of one of the environmental parameters. Similarly, the outdoor air temperature cannot be controlled. Therefore, some embodiments measure or otherwise determine the speed of the compressor and the outdoor air temperature and determine the discharge temperature of the compressor in accordance with the mapping 200. The expansion valve is used to control the discharge temperature to be the desired discharge temperature. In this manner, the superheat can be indirectly controlled.

The manifold 201 of FIG. 2A can be determined using a model of the vapor compression system or determined empirically through experimentation where the evaporator superheat can be measured using sensors and instrumentation absent in commercial systems. During experimentation, the expansion valve is used to directly regulate the evaporator superheat to a small positive value, and conditions such as the compressor speed and the outdoor air temperature are varied. The discharge temperature is measured at these different conditions and the results of individual experiments 202 can be plotted to determine the manifold 201 that best fits the empirical data. The manifold can be represented parametrically or empirically. Some embodiments represent the mapping 200 as an equation or a lookup table.

Figure 2B:
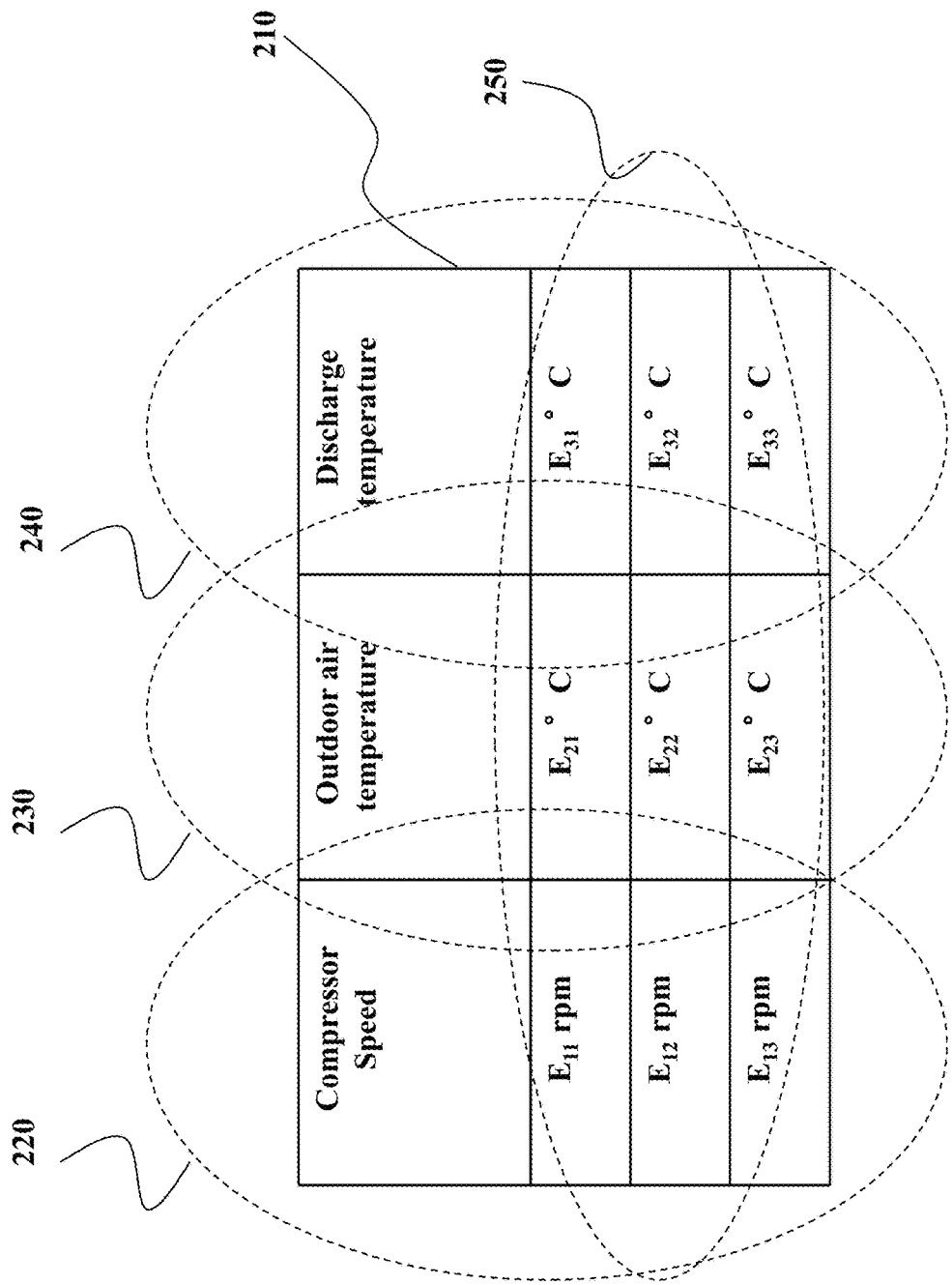
FIG. 2B is a table representing the mapping according another embodiment of the invention.

FIG. 2B shows a table 210 representing a mapping between the speed of the compressor 220, the outdoor air temperature 230 and the discharge temperature 240. Typically, the table 210 is predetermined and stored in the memory. During an operation of the vapor compression system, a processor 116 can determine the set of values 250 based on the value of the speed of compressor provided by, e.g., the compressor control device 110, and the value of the outdoor temperature provided by the second temperature sensor 112.

In some embodiments, the compressor control device determines the speed of the compressor based on the outdoor temperature. In those embodiments, the table 210 can include only the mapping between the speed of the compressor and the discharge temperature of the compressor. In those embodiments, the outdoor air temperature is accounted for indirectly, through the compressor control device. Other variations of the mapping are possible. For example, one embodiment stores the mapping as a function of the speed of the compressor and the outdoor air temperature.

In response to determining the desired discharge temperature, the feedback controller can generate a command to the valve control device to reduce an error between a current discharge temperature measured by the first temperature sensor and the desired discharge temperature determined by the processor 116 using the mapping 200.

However, for some systems using variable speed compressors, abrupt changes in control of the valve in response to the abrupt change of the speed of the compressor can destabilize the operation of the system, as described below. Specifically, the feedback controller acts on an error signal, and the magnitude and frequency content of that error signal can determine the stability of a closed loop system. Thus, some embodiments determine the rate-limited desired discharge temperature according to a transition function to continuously transition the current discharge temperature to the desired discharged temperature.

For example, in many vapor compression systems, the speed of the variable speed compressor is often modified in response to a change in a desired temperature. For example, a user can reduce the setpoint of a thermostat. This abrupt change in the room temperature setpoint is often accompanied by a corresponding abrupt change in compressor speed. Because the compressor speed is a component in the mapping 200, the corresponding desired discharge temperature can also change abruptly.

FIG. 3A shows a time-dependent relationship 315 between a change in the values of discharge temperature 310 and errors 320 between the actual and desired discharge temperatures. For example, if the desired discharge temperature 301 is changed abruptly, then the error signal 304 provided to the feedback controller for driving the expansion also changes abruptly and, typically, with a large magnitude.

This large and abrupt change in the error signal can lead to instabilities of the vapor compression system. For example, if a user changes an environmental parameter, e.g., reduces the thermostat setpoint, then the compressor control device abruptly increases the compressor speed to reduce the refrigerant temperature at the evaporator, and thereby to decrease the temperature. According to the mapping 200, there is a corresponding increase in desired compressor discharge temperature that is provided to the valve control device controlling an expansion valve. In order to achieve the increase in the discharge temperature, the valve control device commands the valve to decrease its opening. This causes a reduction in the amount of refrigerant entering the evaporator. Because the heat transfer in the evaporator depends on both the temperature and mass flow rate of the refrigerant, by closing the valve, the mass flow rate of refrigerant can be reduced to inhibit that heat transfer. As a result, the vapor compressor system cannot achieve the desired room temperature, and the compressor control device commands the compressor to further increase the speed, ultimately leading to a runaway condition of maximum compressor speed and minimum valve opening.

It is realized that this unstable situation can be avoided by appropriately filtering or shaping the signal provided to the valve control device. Referring again to FIG. 3A, the abrupt and discontinuous function 301 representing a change of the desired compressor discharge temperature can be smoothed 303 for transitioning a current discharge temperature 312 to the desired discharge temperature 314, such that the transition is continuous and a rate of change of the transition is limited. The smoothness can be done according to a transition function determining the rate-limited desired discharge temperature as a function of time. The transition function defining the transition 303 is continuous in contrast with the discontinuous transition 301. The limited rate of change of the transition function ensures smoothness of the transition, and means that the transition function is differentiable at all instances of time during the transition from the previous to the new value of the discharge temperature.

By limiting the rate of change of the transition function, the difference between the rate-limited discharge temperature 303 and the actual discharge temperature 302 results in a smaller error signal 305. This error signal does not destabilize the operation of the vapor compression system controlled by a feedback controller.

As used herein, the desired discharge temperature is the discharge temperature of the compressor as determined using the mapping 200. An example of the desired discharge temperature is a value 314. The rate-limited desired discharge temperature is a discharge temperature determined using the transition function. In one embodiment, the input to the transition function is the desired discharge temperature and output is a transition 303 representing the rate-limited desired discharge temperature at different points of time.

The actual discharge temperature is a discharge temperature measured at different points of time. Example of the actual discharge temperature is a signal 302. In some embodiments the actual discharge temperature is driven to the desired discharge value by a feedback controller taken as an input corresponding pairs of the actual and rate-limited desired discharge temperatures to determine an error of the error signal 305.

The feedback controller commands to increase or decrease an opening of the valve in such a way as to drive the error signal to zero. For example, increasing the valve opening increases the refrigerant flow rate and causes a corresponding decrease in actual discharge temperature. Conversely, decreasing the valve opening causes a corresponding increase in the actual discharge temperature. According to this general relationship, a feedback controller, e.g., with integral action, operating on an error signal that is the difference between corresponding pairs of the rate-limited desired discharge temperature and the actual discharge temperature can be used to control the valve in such a way as to drive the error signal to zero.

Figure 3B:
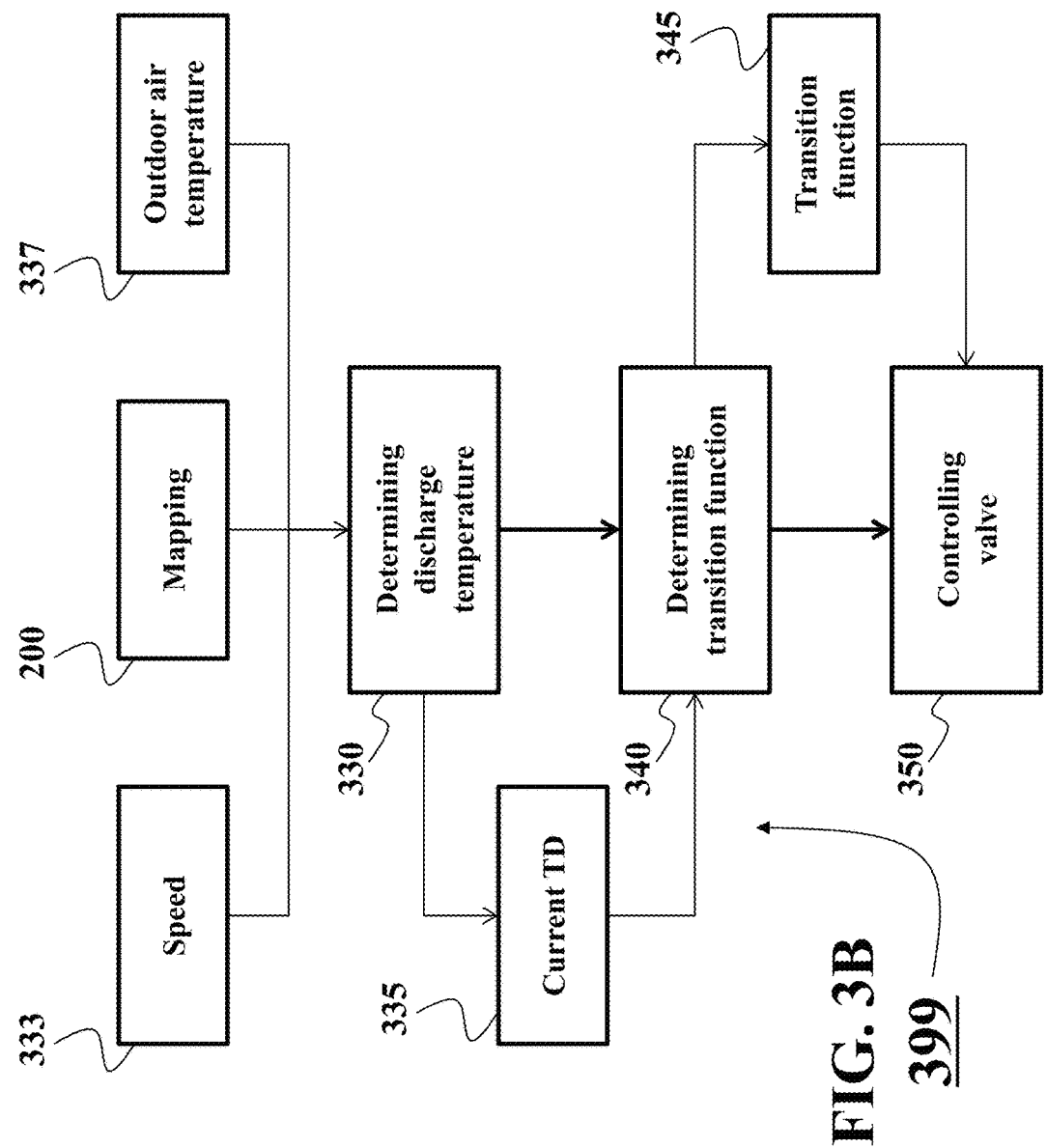
FIG. 3B is a block diagram of a method for controlling a vapor compression according to one embodiment of the invention employing some principles described in connection with FIG. 3A.

FIG. 3B shows a block diagram of a method for controlling a vapor compression system including a variable speed compressor. The method employs some principles described in connection with FIG. 3A. The method can be implemented using a processor 399. The method determines 330 a new value 335 of a discharge temperature (TD) 335 of the compressor using the outdoor air temperature and a mapping 200 between values of the discharge temperature of the compressor and values of the speed of the compressor 333 and the outdoor air temperature. An example of the mapping 200 is a manifold 201 or a table 210. Typically, the new value of the discharge temperature is determined in response to a change of a speed of the compressor of the vapor compression system.

Next, the method generates 340 a transition function 345 for transitioning a previous value of the discharge temperature to the new value of the discharge temperature, such that the transition function is continuous and a rate of change of the transition function is limited. The example of the previous value is a new value 335 determined by the previous iteration of the method.

Using the transition function 345, the method controls the valve of the vapor compression system such that the discharge temperature transitions from the current value to the new value based on the transition function. For example, in some embodiments a command to modify an opening of the valve such that the error between a current discharge temperature measured at an instant of time and a desired discharge temperature determined at the instant of time using the transition function is reduced. In such manner the control of the system is efficient and yet leaves the system in a stable condition.

Figure 4A:
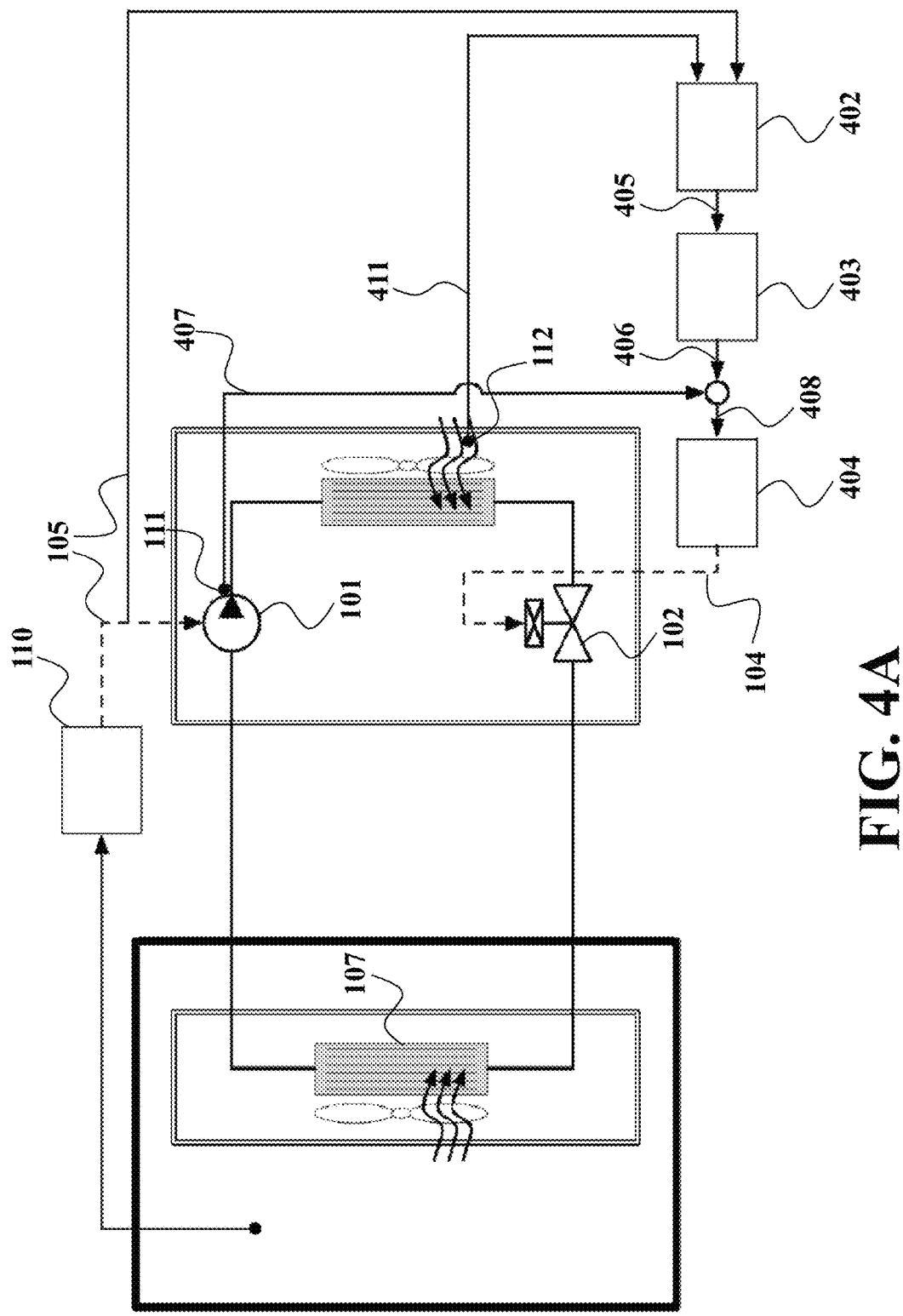
FIGS. 4A and 4B are a schematic of a feedback control loop and a block diagram of a method for controlling the vapor compression system according to another embodiment.
Figure 4B:
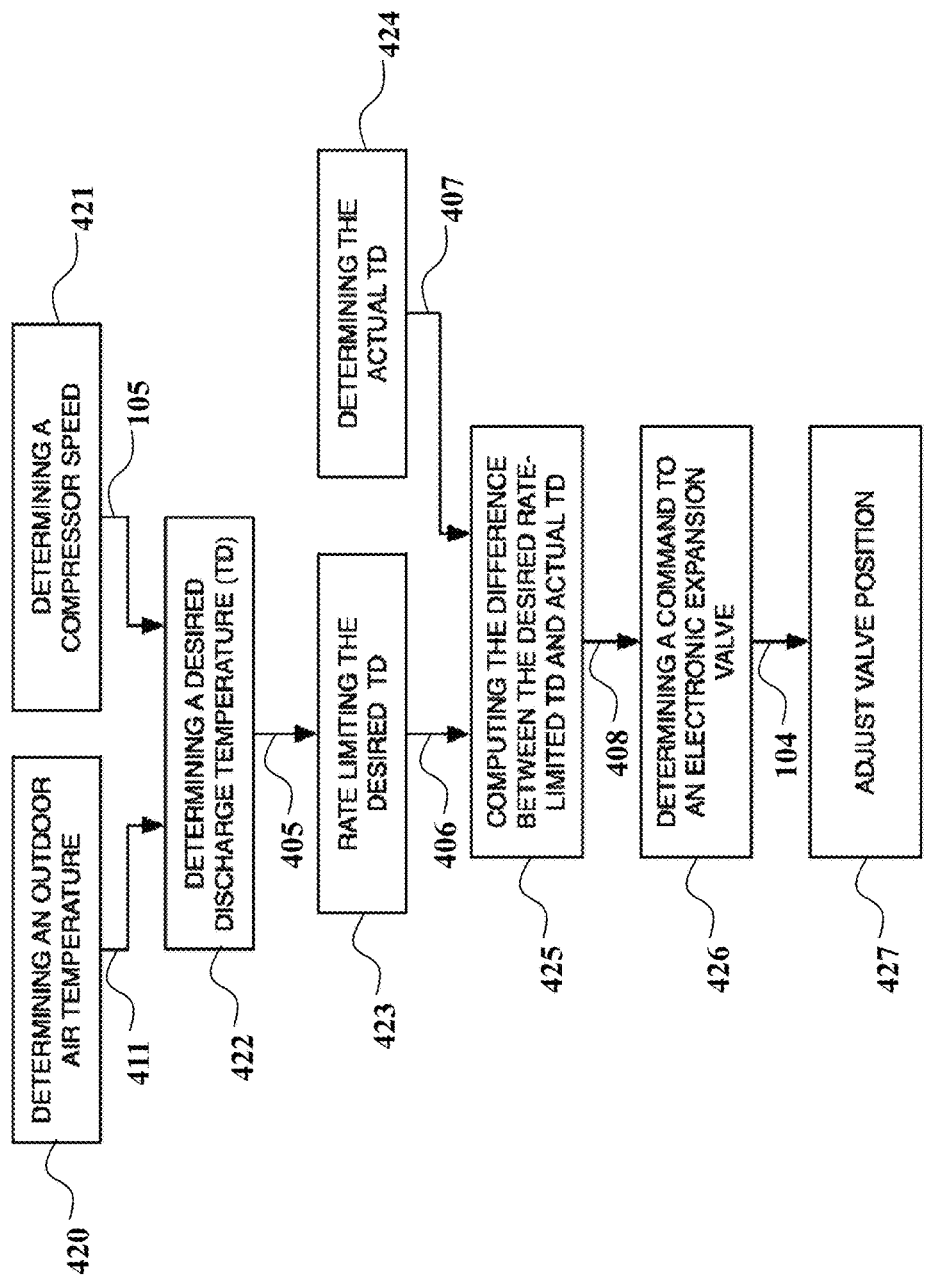

FIGS. 4A and 4B show a schematic of a feedback control loop and a block diagram of a method for controlling the vapor compression system according to another embodiment. The outdoor air temperature is measured 420 by a second temperature sensor 112 positioned in the flow path of outdoor air interacting with the condenser. Additionally, the compressor speed is determined 421 by direct measurement of the compressor speed, or through communication with the compressor control device 110. The outdoor air temperature 411 and compressor speed 105 are then provided to a transition module 402 that determines 422 the desired discharge temperature. The transition module 402 can be implemented using a processor 116.

This desired discharge temperature 405 is then filtered and rate limited 423 to provide a rate-limited desired discharge temperature 406. The rate-limited desired discharge temperature can be determined using the transition function 345. The transition function can be predetermined or determined online. Independently, the actual discharge temperature is determined 424, e.g., measured by a first temperature sensor 111.

The rate-limited desired discharge temperature 406 and the actual discharge temperature 407 are compared 425 to determine an error signal 408. This error signal is provided to a feedback controller 404, which determines 426 a command to an expansion valve. This command 104 is then provided to the expansion valve, causing the valve to move correspondingly 427 to minimize the error.

The feedback control loop provides an elegant implementation of the transition function. The change of the discharge temperature is smoothed iteratively at every step of the feedback control loop leading to the adjustment of the valve position. Such steps can be repeated until the actual discharge temperature reaches the desired discharge temperature.

The discharge temperature of the compressor cannot be instantaneously changed to arbitrary values, because of the natural behavior associated with the physics of heating. The compressor is a relatively massive component and including steel or other metal alloys. Instantaneous changes in heat are filtered by the large thermal capacitance of the material and the temperature accordingly reacts slowly as dictated by the thermal time constant of the compressor. Accordingly, in some embodiments, the rate of change of the transition function is determined based on a mass of the compressor, a thermal conductivity of a material comprising the compressor, or the outdoor air temperature, or combinations thereof.

For example, an energy balance on a compressor with material density p, volume V, thermal capacitance cp, and surface area A gives the differential equation:

$$dT/dt = -1/tau*(T-Ta)$$

where tau is the thermal time constant and is given by:

$$tau = p*V*cp/(h*A)$$

T is the compressor discharge temperature, Ta is the outside air temperature, and h is the heat transfer coefficient between the compressor and air. The solution to this different equation is a first order exponential function.

Some embodiments are based on a realization that in order to keep the error signals of the internal feedback controller small, a change of the desired discharge temperature of the compressor should track the natural response of the compressor.

Accordingly, in some embodiments, the rate of change of the transition function is proportional to a thermal time constant of the compressor. For example the transition function can be determined as low pass filter, e.g., a first order low pass filter with a time constant proportional or equal to the thermal time constant of the compressor. One realization of such a filter is the discrete-time, first-order exponential moving average equation. For example, in one embodiment, the transition function is determined according to $$y[k] = a*u[k] + (1-a)*y[k-1],$$

wherein y[k] is an output of the transition function at a timestep k, u [k] is an input to the transition function at the timestep k, and y[k−1] is an output of the transition function at a previous timestep.

The parameter a is a smoothing factor having values between 0 and 1. The smoothing factor can determined the rate of change of the transition function. For smaller values of a, the output responds more slowly and with a more severe rate limit. The value of a in the low-pass filter can be determined by a number of methods, using a model of the vapor compression system or empirically.

Figure 5:
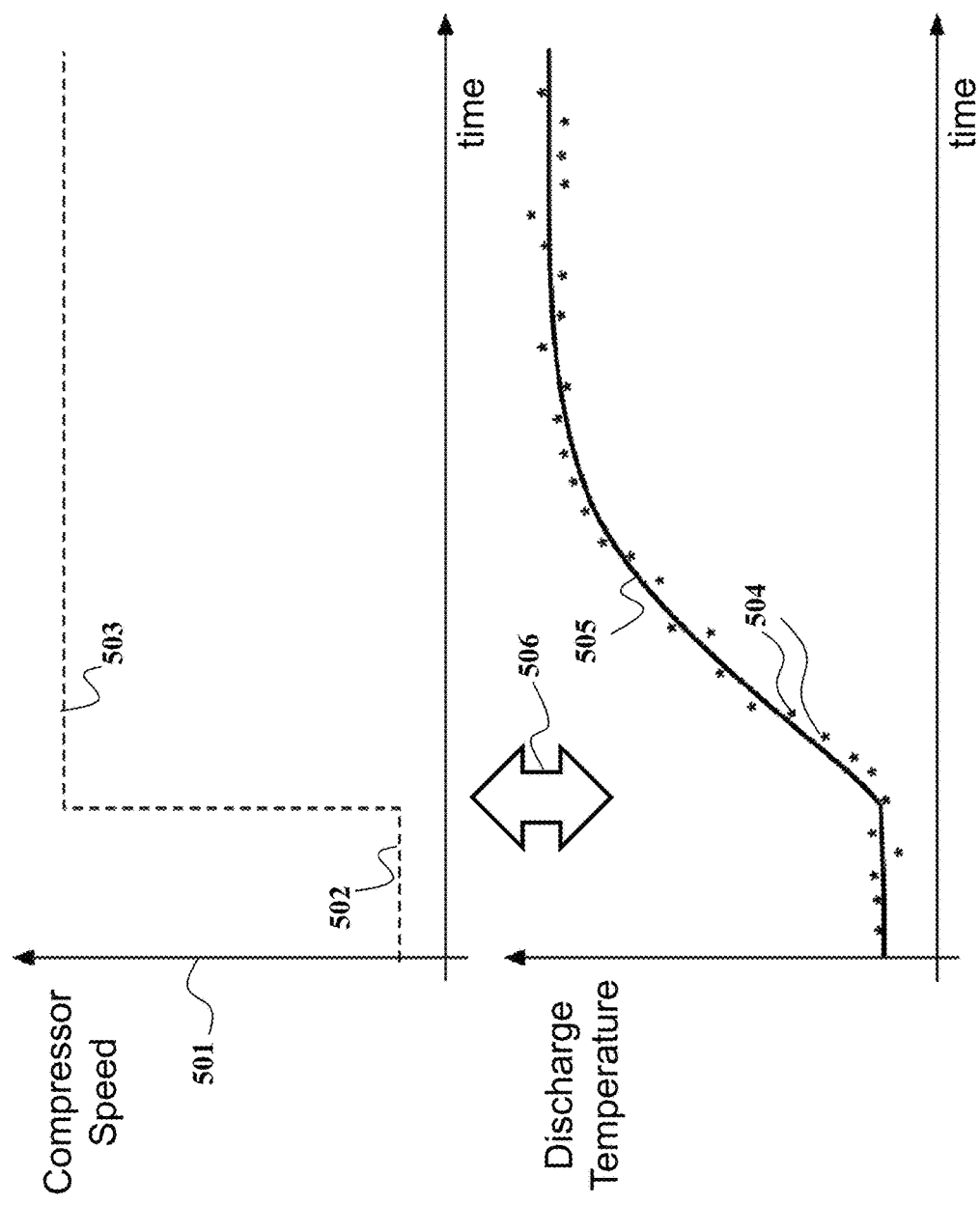
FIG. 5 is an illustration of determining a smoothing factor of the transition function empirically according to one embodiment of the invention.

FIG. 5 shows an illustration of determining the smoothing factor of the transition function empirically according to one embodiment of the invention. For example, an experiment is performed where the compressor speed 501 is abruptly increased from an initial value 502 to a final value 503 and measurements of the discharge temperature 504 are recorded. The parameter a is then determined 506 as the value that best produces a response 505 that matches the experimental data.

Another method for determining the time-constant of the low-pass filter is analytically using the equation for tau given above. The thermal time constant is a function of parameters which are known from the design of a compressor including the compressor's material composition, which determines the thermal capacitance cp and material density p, and dimensions, which determine volume V and surface area A.

The rate of change to which the desired discharge temperature is limited may be related to certain physical properties of the compressor. The rate of change of the compressor can depend on the mass of the compressor, the thermal conductivity of the material comprising the compressor, and the outdoor air temperature. Therefore, an appropriate rate limit can be computed from an estimate of these parameters.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Alternatively or additionally, the invention may be embodied as a computer readable medium other than a computer-readable storage medium, such as a propagating signal.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The terms "program" or "software" are used herein in a generic sense to refer to any type of computer code or set of computer-executable instructions that can be employed to program a computer or other processor to implement various aspects of the present invention as discussed above.

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

A "module" or a "unit" refers to a basic component in a computer that performs a task or part of a task. It can be implemented by either software or hardware.

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. The vapor compression systems are used in applications beyond the conditioning of residential or commercial spaces. For example, the vapor compression cycle can be used by the vapor compression system to cool computer chips in high-performance computing applications A "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

"Actuators of a vapor compression system" refer to any components of the vapor compression system having an operation controllable by the control systems. The actuators include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor-compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor-compression system.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a vapor compression system including a variable speed compressor, comprising:
   at least one processor operatively connected to a memory, a compressor and a valve, of the vapor compression system, the at least one processor configured to
   determine a new value of speed of the compressor, wherein the compressor is a variable speed compressor for compressing and pumping refrigerant through the vapor compression system;
   retrieve from the memory a mapping specifying values of discharge temperature of the vapor compression system for different combinations of values of speed of the compressor and outdoor air temperature;
   determine, using the mapping, a desired discharge temperature of the compressor for the new value of speed of the compressor and an actual value of the outdoor air temperature;
   determine a transition function for transitioning the discharge temperature to the desired discharge temperature as a function of time representing a low pass filter with a time constant proportional to the thermal time constant of the compressor, such that a rate of change of the transition function is proportional to a thermal time constant of the compressor;
   control the compressor to change a current speed of the compressor to the new value; and
   control the valve for providing an adjustable pressure between a high-pressure portion and a low-pressure portion of the vapor compression system such that the discharge temperature is transitioned to the desired discharge temperature.

2. The system of claim 1, wherein the valve is controlled iteratively over different instances of time until the discharge temperature is transitioned to the desired discharge temperature, and wherein the controlling the valve at an instance of time, comprises:
   receive a measurement of the actual discharge temperature at the instance of time;
   update the rate-limited desired discharge temperature according to a value of the transition function at the instance of time;
   compare the actual discharge temperature with the rate-limited desired discharge temperature to determine an error; and
   generate a command to modify an opening of the valve such that the error is reduced.

3. The system of claim 1, wherein the processor is further configured to:
   determine the thermal time constant based on a mass of the compressor, a thermal conductivity of a material of the compressor or the outdoor air temperature, or combinations thereof.

4. The system of claim 1, further comprising:
   determine the mapping using a model of the system.

5. A system for controlling a vapor compression system, comprising:
   at least one processor operatively connected to a memory, a compressor and a valve, of the vapor compression system, the at least one processor configured to
   determine a new value of speed of the compressor, wherein the compressor is a variable speed compressor for compressing and pumping refrigerant through the vapor compression system;
   retrieve from the memory a mapping specifying values of discharge temperature of the vapor compression system for different combinations of values of speed of the compressor and outdoor air temperature;
   determine, using the mapping, a desired discharge temperature of the compressor for the new value of speed of the compressor and an actual value of the outdoor air temperature;
   determine a transition function for transitioning the discharge temperature to the desired discharge temperature as a function of time representing a low pass filter with a time constant proportional to the thermal time constant of the compressor, such that the transition function is a low pass filter;
   control the compressor to change a current speed of the compressor to the new value; and
   control the valve for providing an adjustable pressure between a high-pressure portion and a low-pressure portion of the vapor compression system such that the discharge temperature is transitioned to the desired discharge temperature.

6. A system for controlling a vapor compression system, comprising:
   at least one processor operatively connected to a memory, a compressor and a valve, of the vapor compression system, the at least one processor configured to
   determine a new value of speed of the compressor, wherein the compressor is a variable speed compressor for compressing and pumping refrigerant through the vapor compression system;
   retrieve from the memory a mapping specifying values of discharge temperature of the vapor compression system for different combinations of values of speed of the compressor and outdoor air temperature;
   determine, using the mapping, a desired discharge temperature of the compressor for the new value of speed of the compressor and an actual value of the outdoor air temperature;
   determine a transition function for transitioning the discharge temperature to the desired discharge temperature as a function of time representing a low pass filter with a time constant proportional to the thermal time constant of the compressor, and
   determine the transition function as a first order low pass filter with a time constant proportional to a thermal time constant of the compressor;
   control the compressor to change a current speed of the compressor to the new value; and
   control the valve for providing an adjustable pressure between a high-pressure portion and a low-pressure portion of the vapor compression system such that the discharge temperature is transitioned to the desired discharge temperature.

7. A system for controlling a vapor compression system, comprising:
   at least one processor operatively connected to a memory, a compressor and a valve, of the vapor compression system, the at least one processor configured to determine a new value of speed of the compressor, wherein the compressor is a variable speed compressor for compressing and pumping refrigerant through the vapor compression system;

retrieve from the memory a mapping specifying values of discharge temperature of the vapor compression system for different combinations of values of speed of the compressor and outdoor air temperature;

determine, using the mapping, a desired discharge temperature of the compressor for the new value of speed of the compressor and an actual value of the outdoor air temperature;

determine a transition function for transitioning the discharge temperature to the desired discharge temperature as a function of time representing a low pass filter with a time constant proportional to the thermal time constant of the compressor, and determining the transition function according to $$y[k]=*u[k]+(1-a)*y[k-1],$$

wherein y[k] is an output of the transition function at a timestep k, u[k] is an input to the transition function at the timestep k, and y[k−1] is an output of the transition function at a previous timestep, and a parameter a is a smoothing factor having values between 0 and 1;

control the compressor to change a current speed of the compressor to the new value; and control the valve for providing an adjustable pressure between a high-pressure portion and a low-pressure portion of the vapor compression system such that the discharge temperature is transitioned to the desired discharge temperature.

* * * * *